United States Patent
Bishop

(10) Patent No.: US 9,280,767 B2
(45) Date of Patent: *Mar. 8, 2016

(54) SYSTEM AND METHOD FOR LINKING POINT OF SALE DEVICES WITHIN A VIRTUAL NETWORK

(71) Applicant: American Express Travel Related Services Company, Inc., New York, NY (US)

(72) Inventor: Fred Bishop, Glendale, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 278 days.

This patent is subject to a terminal disclaimer.

(21) Appl. No.: 14/184,324

(22) Filed: Feb. 19, 2014

(65) Prior Publication Data

US 2014/0172606 A1  Jun. 19, 2014

Related U.S. Application Data

(63) Continuation of application No. 11/164,199, filed on Nov. 14, 2005, now Pat. No. 8,694,435.

(51) Int. Cl.
  *G06Q 20/20* (2012.01)
  *H04L 29/14* (2006.01)

(52) U.S. Cl.
  CPC .............. *G06Q 20/202* (2013.01); *H04L 69/40* (2013.01)

(58) Field of Classification Search
  CPC ..................................................... G06Q 20/20
  See application file for complete search history.

(56) References Cited

U.S. PATENT DOCUMENTS

| | | | |
|---|---|---|---|
| 4,423,287 A | 12/1983 | Zeidler | |
| 5,481,265 A | 1/1996 | Russell | |
| 5,649,099 A | 7/1997 | Theimer et al. | |
| 5,729,220 A | 3/1998 | Russell | |
| 5,796,832 A | 8/1998 | Kawan | |
| 5,903,652 A | 5/1999 | Mital | |
| 6,049,778 A | 4/2000 | Walker et al. | |
| 6,327,578 B1 | 12/2001 | Linehan | |
| 6,377,699 B1 | 4/2002 | Musgrave et al. | |
| 6,494,367 B1 | 12/2002 | Zacharias | |
| 7,386,471 B1 | 6/2008 | Nack | |
| 2002/0038371 A1 | 3/2002 | Spacey | |
| 2002/0156727 A1 | 10/2002 | LeVake et al. | |
| 2003/0046237 A1 | 3/2003 | Uberti | |
| 2003/0204728 A1 | 10/2003 | Irwin | |
| 2004/0010458 A1 | 1/2004 | Friedman | |
| 2004/0023711 A1 | 2/2004 | Knapp | |
| 2004/0030645 A1 | 2/2004 | Monaghan | |

(Continued)

OTHER PUBLICATIONS

Dixon et al., "A token-ring network for local data communications," IBM Systems Journal, vol. 22, 1983, IBM.

(Continued)

*Primary Examiner* — Jacob C. Coppola
(74) *Attorney, Agent, or Firm* — Snell & Wilmer L.L.P.

(57) ABSTRACT

A system and method for interconnecting multiple point of sale devices creating a mesh-like network structure which reduces connectivity costs while providing greater reliability due to multiple network paths is disclosed. By linking point of sale devices within a virtual network, the need for individual connections to a point of sale controller is eliminated and alternative network paths are provided, thereby ensuring maximum up-time and optimal connection speeds.

19 Claims, 3 Drawing Sheets

(56) References Cited

U.S. PATENT DOCUMENTS

2004/0044627 A1 3/2004 Russell et al.
2004/0098350 A1 5/2004 Labrou et al.
2009/0164327 A1 6/2009 Bishop et al.
2009/0164329 A1 6/2009 Bishop et al.

OTHER PUBLICATIONS

White, "How Computers Work", Millennium Edition, 1999, Que Corporation, Indianapolis, IN, all pages.
Derfler, "How Networks Work", Bestseller Edition, 1996, Ziff-Davis Press, Emeryville, CA, all pages.
Gralla, "How the Internet Works", Millennium Edition 1999, Que Corporation, Indianapolis, IN, all pages.
Muller, "Desktop Encyclopedia of the Internet", 1999, Artech House Inc., Norwood, MA, all pages.
"The Bank Credit Card Business", American Bankers Association, 1996, all pages.
USPTO; Office Action dated Jul. 21, 2008 in U.S. Appl. No. 11/164,199.
USPTO; Final Office Action dated Dec. 23, 2008 in U.S. Appl. No. 11/164,199.
USPTO; Advisory Action dated Mar. 4, 2009 in U.S. Appl. No. 11/164,199.
USPTO; Office Action dated May 26, 2009 in U.S. Appl. No. 11/164,199.
USPTO; Final Office Action dated Nov. 18, 2009 in U.S. Appl. No. 11/164,199.
USPTO; Advisory Action dated Jan. 26, 2010 in U.S. Appl. No. 11/164,199.
USPTO; Notice of Allowance dated Dec. 18, 2013 in U.S. Appl. No. 11/164,199.

SYSTEM AND METHOD FOR LINKING POINT OF SALE DEVICES WITHIN A VIRTUAL NETWORK

CROSS-REFERENCE TO RELATED APPLICATIONS

This application is a continuation of, claims priority to and the benefit of, U.S. Ser. No. 11/164,199 filed Nov. 14, 2005 and entitled "SYSTEM AND METHOD FOR LINKING POINT OF SALE DEVICES WITHIN A VIRTUAL NETWORK," which is incorporated herein in its entirety by reference.

FIELD OF THE INVENTION

The invention generally relates to improved leveraging of a payment authorization network, and more particularly, to a system and method for linking point of sale (POS) devices within domains.

BACKGROUND OF THE INVENTION

As an increasing number of businesses and organizations are realizing the value of accepting transaction instruments (i.e., charge, credit, debit, stored-value and gift cards, fobs and the like) for payment, the network infrastructure employed to transport transactional data both to and from the issuers of such instruments has become more burdened. Ensuring that these networks remain operational and efficient is vitally important to the profitability of both merchants and issuers as well as to the convenience of the consumers.

For many years, merchants did not have an available system for real-time transaction instrument (e.g., card) approval. In other words, an efficient infrastructure did not exist to enable a merchant to automatically determine whether a card had an appropriate available balance or credit line, or whether the card was actually valid. Instead, the merchant would place the customer's card onto a device which served to press an imprint of the card's numbers onto a carbon covered slip of paper. After signing the charge slip, the merchant would issue the carbon copy to the customer while the original would be submitted to the issuer of the card for payment.

Later, point of sale devices were introduced which allowed merchants to swipe a card through a magnetic strip reader or key in the numbers manually. This device would then establish communications with an authorization system of the issuer via a telephone connection and upload data relating to the transaction instrument and purchase to the issuer's approval system. If the card account included a sufficient available balance or credit line, and was not suspended due to, for example, lack of payment, the issuer's authorization system would send an authorization signal to the merchant's device and the merchant would consummate the sale. While this solution provided the merchant with assurance that the card was valid, receiving an authorization was often slow and unreliable.

Today, dedicated high-speed networks exist providing merchants with continuous access to the issuer's authorization system. Modern POS networks have reduced authorization time by eliminating the need for the POS device to establish a modem connection with the issuer. However, the down side is that if the POS network fails for any reason, merchants along the network are unable to process transaction instrument-based transactions until the network is activated again. Further, in order to utilize the network, merchants need to have a dedicated service in order to connect to a boundary device which is, in-turn, connected to the issuer's network. However, the dedicated service significantly increases the cost of connectivity.

While the current technology has improved transaction instrument processing, the technology may not be available for merchants residing in areas where the high-speed network infrastructure does not exist. Further, for mobile merchants (e.g., auto shows, craft shows, auctions, etc.), this option would simply not be practical. To address this problem, merchants may now employ POS devices which utilize a wireless connection to a POS network. However, like cellular technology, the range of such devices is limited.

Therefore, a need exists for a system and method to reduce the cost of dedicated services to merchants, while providing a more reliable network with multiple paths to a POS controller. Further, in order to accept card payments, some businesses in remote areas (where dedicated services are not readily available and where wireless POS devices are often out of range from the POS controller) have no other option than to employ either the old carbon copy process or utilize a modem connected POS device. There is a need to enable remote merchants to connect to a POS controller through a series of other merchant's POS devices, which are progressively closer to the POS controller.

SUMMARY OF THE INVENTION

The invention facilitates the interconnection of multiple wireless POS devices, thus eliminating the need for each individual device to be connected to a POS controller that is connected to an acquirer's network. By enabling wireless POS devices to receive and transmit transactions on behalf of other merchants, the POS devices may serve as relay stations for out-of-range wireless POS devices. Moreover, the invention creates a virtual network which provides a fail-safe and efficient mesh-like structure where multiple paths to the POS controller exists.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for coupling any number of wireless POS devices together to form a virtual network. The "mesh" configured network of the invention results in fewer direct connections to the acquiring tier and multiple network paths for POS devices to utilize should one network path experience a problem. As used herein, coupling, connecting or similar terms include any system, method or components for enabling communication between POS devices.

Figure 1:
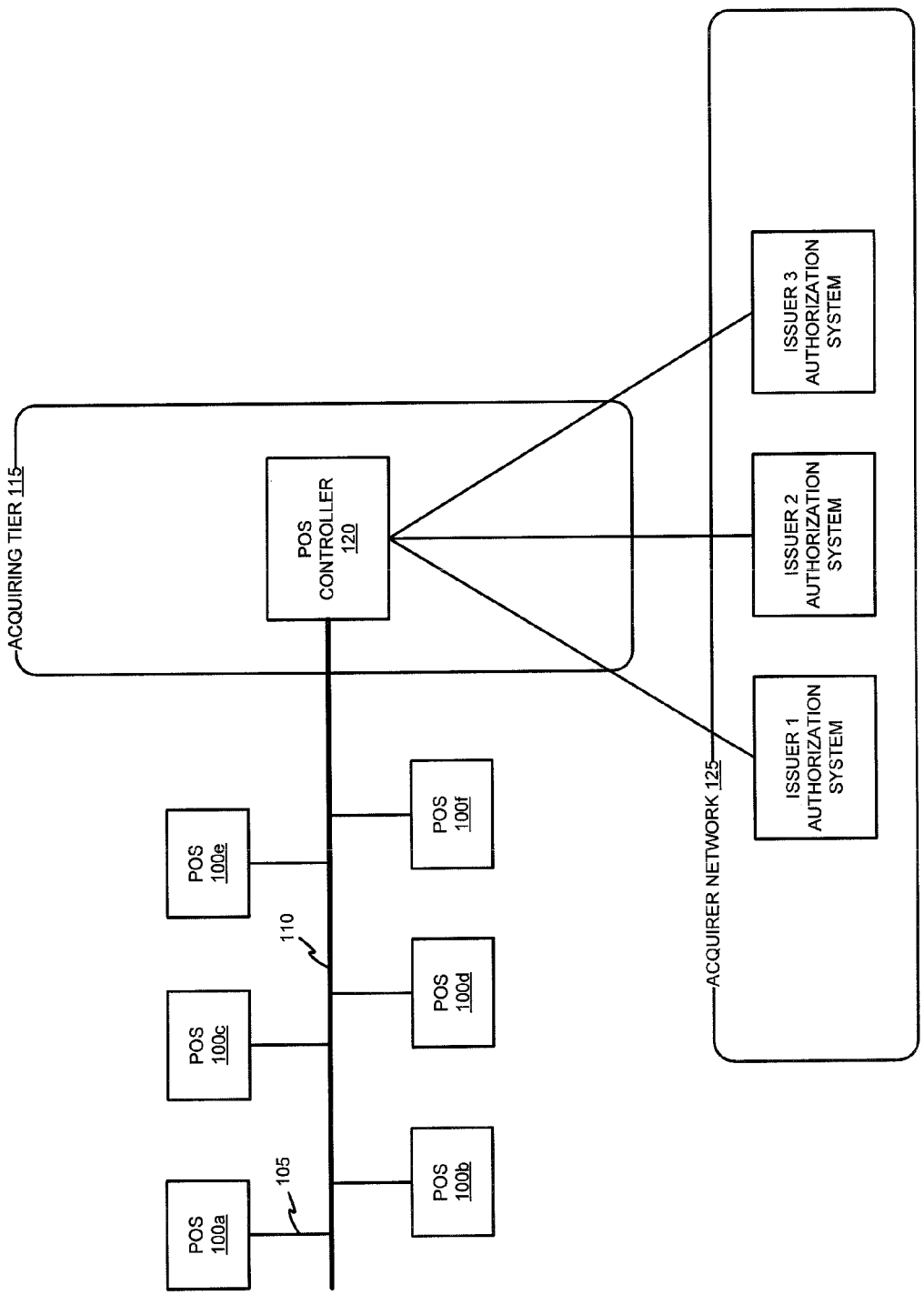
FIG. 1 is a block diagram illustrating the prior art means for connecting POS devices to acquirers networks.

FIG. 1 is a block diagram illustrating a prior art system which is widely used to couple POS devices to acquirer networks. While other network architectures are known in the art, the underlying architecture of a POS network 110 with multiple dedicated connections 105 remains consistent with most known solutions. According to the prior art, POS devices 100 each have a dedicated connection 105 to a network. POS network 110 provides the pathway between dedicated connections 105 and a POS controller 120. POS controller 120 routes transactional data both to and from an appropriate acquirer network 125. If an outage is encountered in network 110, POS devices 100 may lose their connection to POS controller 120 in an acquiring tier 115. For example, if an outage occurs, then POS device 100c, 100b and 100a may be unable to run transaction card authorizations or other transactions.

Practitioners will appreciate that while FIG. 1 illustrates an exemplary prior art system for coupling POS devices to acquirer networks, any number of architectures, configurations or financial arrangements may be employed. While acquirer and issuing networks are typically distinct, wherein a first organization ("acquirer") acquirers merchants and a second organization ("issuer") issues cards, some organizations perform both functions. Moreover, the acquirer may perform the function of an issuer, and similarly, an issuer may perform the function of an acquirer. In another embodiment, even when the acquirer issues cards, the acquirer may still receive a charge from a merchant for a card issued by another organization. In this case, the acquirer may, for example, pay the merchant and then sell the receivable to the other issuing organization. Each issuer and/or acquirer may possess their own issuing network; therefore, when a merchant connects to the acquiring network through the POS controller 120, the acquirer determines the identity of the card and then routes the transaction to the appropriate entity within the acquirer network 125 for authorization. As such, an acquirer, issuer and merchant may be used interchangeably and perform any or all of the functions of each entity.

The prior art process typically begins when a merchant or customer slides a financial instrument through a magnetic stripe reader. The magnetic stripe includes an encoded customer account number along with other data used to identify and validate the instrument. This data, in the form of a request, is transmitted to POS network 110 via dedicated connection 105. The request is then received by POS controller 120 within acquiring tier 115 and the request is then routed to the appropriate issuer authorization system within acquirer network 125. The issuer authorization system processes the request, determines if the request should be authorized or declined, then transmits the answer to POS controller 120. Then, POS controller 120 routes the answer to POS network 110 where it is received by the requesting POS device 100 via dedicated connection 105.

In addition to susceptibility to large-scale outages due to failures within the POS network 110 as previously discussed, the prior art architecture further requires each individual POS device 100 to have a dedicated connection 105 to the POS network 110. This can be costly for remotely-located merchants.

POS device 100 and the issuer authorization system may be interconnected via a second network, referred to as a payment network. The payment network represents existing proprietary networks that presently accommodate transactions for credit cards, debit cards, charge cards, smartcards, and other types of bank/financial institution transaction cards. The payment network is a secure network that is assumed to be secure from eavesdroppers. Examples of the payment network include the American Express®, VisaNet®, and Veriphone® networks. POS device 100 may connect to any number of payment networks. For example, a merchant may be acquired by a merchant acquirer on behalf of Visa®, MasterCard® and Discover®, but may be separately acquired by American Express. Therefore, PUS network 110 may be connected to any number of acquiring networks.

As used herein, the term "network" shall include any electronic communications means which incorporates both hardware and software components of such. Communication among the parties in accordance with the invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

An "account" or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identify a particular merchant for purposes of card acceptance, account reconciliation, reporting, or the like.

As will be appreciated by one of ordinary skill in the art, the system may be embodied as a customization of an existing system, an add-on product, upgraded software, a stand alone system (e.g., kiosk), a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially available web-browser software package.

The contemplates uses in association with web services, utility computing, pervasive and individualized computing, security and identity solutions, autonomic computing, commodity computing, mobility and wireless solutions, open source, biometrics, grid computing and/or mesh computing.

The may be described herein in terms of functional block components, screen shots, optional selections and various processing steps. It should be appreciated that such functional blocks may be realized by any number of hardware and/or software components configured to perform the specified functions. For example, the may employ various integrated circuit components, e.g., memory elements, processing elements, logic elements, look-up tables, and the like, which may carry out a variety of functions under the control of one or more microprocessors or other control devices. Similarly, the software elements of the may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system is described herein with reference to block diagrams and flowchart illustrations of methods, apparatus (e.g., systems), and computer program products according to various aspects of the system. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Figure 2:
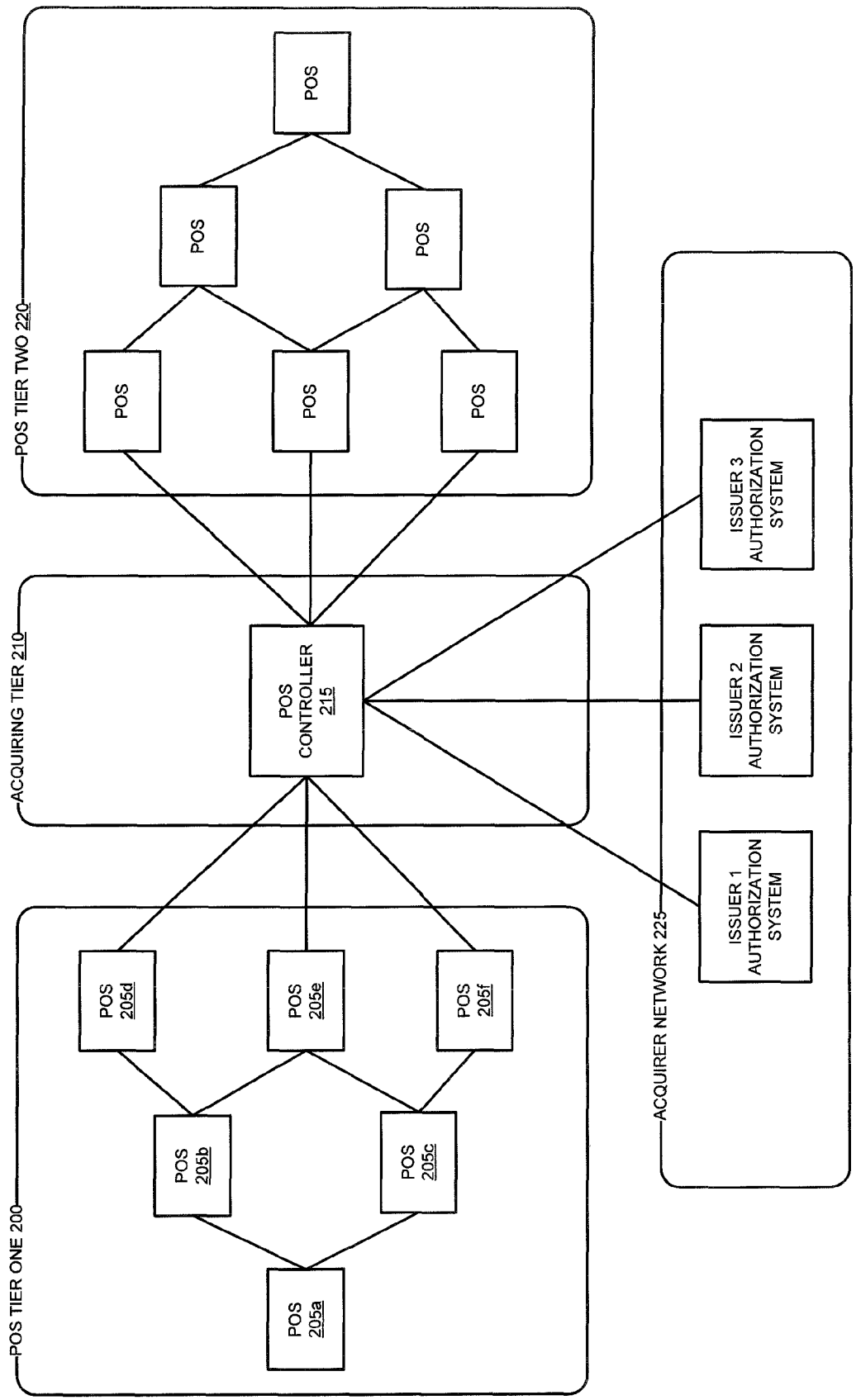
FIG. 2 is a block diagram illustrating an exemplary mesh network structure providing fewer POS device direct connections with an acquiring tier and providing connection redundancy in accordance with one embodiment of the invention; and, FIG. 3 illustrates the major components of an exemplary POS device for connecting to acquirers networks in accordance with one embodiment of the invention.
Figure 3:
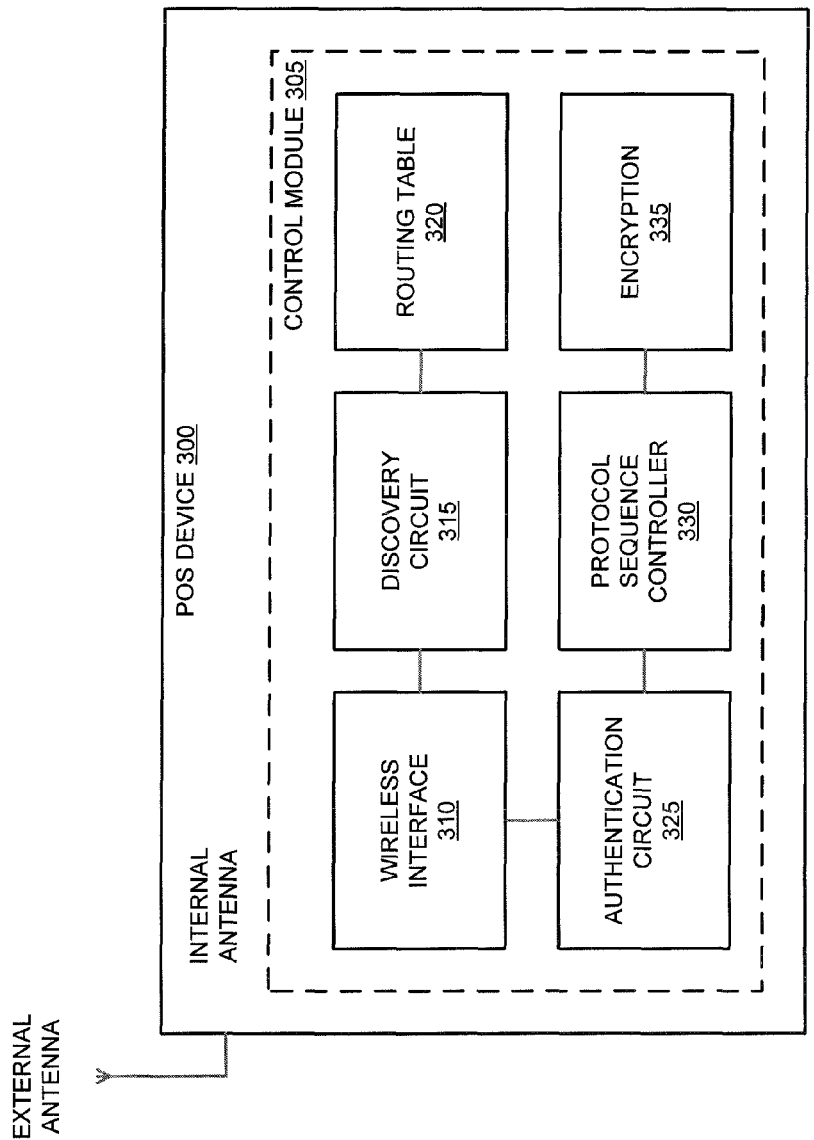

FIG. 2 is a block diagram illustrating an exemplary mesh network architecture in accordance with the present invention which provides fewer POS device 205 direct connections with an acquiring tier which inherently provides connection redundancy. FIG. 2 will be discussed herein with reference to the various POS device 300 components as illustrated in FIG. 3.

According to an exemplary embodiment, POS devices 205 are divided into domains or tiers. POS tiers 200 and 220 are individually comprised of groups of POS devices 205 located in geographical proximity to one another. Further, a POS tier may contain any number of POS devices 205 and cover a geographical area of any size. However, in a wireless implementation, distance between POS devices 205 within any given POS tier should be considered, as wireless communication between at least two POS devices 205 may be needed. POS devices 205 may be self organized within a grid or may be configured to communicate with specific POS devices 205 through a wireless interface 310. For example, POS device 205a may specifically recognize POS 205c as a "trusted POS device." In an exemplary embodiment, POS devices 205 may include an encryption module 335 to encrypt transmission data. Transmission data is encrypted to enable a next in line POS device 205 to route the data appropriately, while preventing the next in line POS device 205 from deciphering specific payment information.

The tiered architecture presented in FIG. 2 provides at least two benefits, (1) to ensure adequate signal strength to prevent disruptions within data connections and, (2) to authenticate POS devices 205 through an authentication circuit 325 using signed identification tokens. Identification tokens enable a POS device 205 to determine the validity of a signature and determine if the token source is trustworthy. A signed identification token may include any number of parameters such as, for example, a merchant number, POS number, acquirer number, and the like. A POS device 205 may be configured to use the signed identification token parameters to determine which merchants, POS devices and acquirers it should trust to transmit data on its behalf.

POS devices 205 within POS tier one 200 are interconnected in a grid or mesh-like configuration. For example a fixed hierarchy may be created to ensure that POS 205a, POS 205b and POS 205c always communicate with POS 205d. With the exception of those with a direct connection to the acquiring tier 210, each POS device 205 is in wireless communication with at least two other devices. This creates both redundancy in the network, but also provides for utilization of the strongest or fastest connection. For example, POS 205a has a wireless connection to both POS 205b and POS 205c. Should the connection with POS 205b be lost for any reason, POS 205a will not be disabled due to its remaining connection with POS 205c.

In addition to the benefits described above with respect to redundancy, practitioners will appreciate that the architecture of the present invention offers other advantages such as an ability to provide a connection to a remote POS device 205 where other connection methods may not be available or may be financially prohibitive.

Moreover, practitioners will appreciate that the system may be implemented within a fully wireless configuration through a wireless interface 310, wireline configuration or as a combination thereof. For example, a POS device 205 may transmit payment requests over a wireline connection while, at the same time, receiving wireless requests from other POS devices and routing them through the wireline connection. The system may further include any number of routers with wireless and/or wireline connectivity.

POS device 205 may invoke a discovery circuit 315 to periodically broadcast a message containing POS device 205 information such as, for example, merchant information and acquiring information. Messages may be processed through POS device protocol sequence controller 330 when received in order to ensure that the communications protocol is compatible. If it is determined that a first POS device 205 and a second POS device 205 should be in the mesh together, then a communications channel between the two is established. The first and second POS devices 205 may then establish a routing table 320 within a memory structure of the control module 305 identifying POS devices 205 that have the shortest hop to a POS device 205 with the wireline or acquirer connectivity.

In order to construct routing table 320, various Internet protocols may be used to transmit identifying data from one POS device 205 to another. POS device 205 is configured to ultimately connect to a specified POS controller 215 and routing information is stored in routing table 320 accordingly. Information stored in routing table 320 may include, for example, an IP address, a name of a POS device 205 that is connected to the wireline network, or the name of the acquiring network for a direct connection.

While the steps outlined above represent an embodiment of the invention, practitioners will appreciate that there are any number of computing algorithms that may be applied to create similar results. The steps are presented for the sake of explanation only and are not intended to limit the scope of the invention in any way.

Benefits, other advantages, and solutions to problems have been described herein with regard to specific embodiments.

However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

I claim:

1. A system comprising:
a first POS merchant device having a first wireless connection with a second POS merchant device, the first POS merchant device storing a routing table specifying the second POS merchant device, the first POS merchant device having a second wireless connection with a third POS merchant device;
wherein the first POS merchant device is programmed to transmit encrypted transactional data with a signed token over the first wireless connection to the second POS merchant device instead of the third POS merchant device based on the routing table;
wherein the second POS merchant device comprises an authentication circuit programmed to authenticate the signed token, thereby authenticating the first POS merchant device, and allow a relay of the encrypted transactional data to a controller specified in the routing table, in response to the first POS merchant device being authenticated, and
wherein the second POS merchant device is included in a first route between the first POS merchant device and the controller, wherein the first route is shorter than a second route between the first POS merchant device and the controller, the second route including the third POS merchant device.

2. The system of claim 1, wherein the first POS merchant device is located at a first point of sale which is configured to interface with a first cash register, and wherein the second POS merchant device is located at a second point of sale which is configured to interface with a second cash register.

3. The system of claim 1, wherein the controller is programmed to receive the encrypted transactional data relayed directly or indirectly from the second POS merchant device, decrypt the relayed encrypted transactional data, determine an acquirer network for the relayed transactional data, and transmit the relayed transactional data to the acquirer network.

4. The system of claim 1, wherein the second POS merchant device is programmed to receive the encrypted transactional data from the first POS merchant device.

5. The system of claim 1, wherein the signed token is used to at least one of identify or authenticate the transactional data.

6. The system of claim 1, wherein the first POS merchant device is programmed to store routing information relating to a preferred fourth POS merchant device.

7. The system of claim 1, wherein the second POS merchant device is configured to receive the transactional data from the first POS merchant device via a fourth POS merchant device.

8. The system of claim 1, wherein the first POS merchant device is configured to communicate with the second POS merchant device via multiple POS merchant devices.

9. The system of claim 1, wherein the signed token may include at least one of: a merchant number, a POS number, or an acquirer number.

10. The system of claim 1, wherein the controller is included in the third POS merchant device.

11. The system of claim 1, wherein the controller is configured to facilitate linking the first POS merchant device and the second POS merchant device into a virtual network, the controller configured to receive encrypted transactional data from at least one of: the first POS merchant device or the second POS merchant device to determine an acquirer network for the encrypted transactional data and to transmit the encrypted transactional data to the acquirer network.

12. A method comprising:
establishing, by a first POS merchant device, a first wireless connection with a second POS merchant device;
transmitting, by the first POS merchant device, encrypted transactional data with a signed token over the first wireless connection to the second POS merchant device instead of a third POS merchant device based on a routing table; and
storing, by the first POS merchant device, a routing table specifying the second POS merchant device;
establishing, by the first POS merchant device, a second wireless connection with the third POS merchant device;
authenticating, by the second POS merchant device and using an authentication circuit, the signed token, thereby authenticating the first POS merchant device;
relaying, by the second POS merchant device and using the authentication circuit, the encrypted transactional data to a controller specified in the routing table, in response to the first POS merchant device being authenticated, and
wherein the second POS merchant device is included in a first route between the first POS merchant device and the controller, wherein the first route is shorter than a second route between the first POS merchant device and the controller, the second route including the third POS merchant device.

13. The method of claim 12, wherein the first POS merchant device is located at a first point of sale is configured to interface with a first cash register, and wherein the second POS merchant device is located at a second point of sale is configured to interface with a second cash register.

14. The method of claim 12, wherein the controller is programmed to receive the encrypted transactional data relayed directly or indirectly from the second POS merchant device, decrypt the relayed encrypted transactional data, determine an acquirer network for the relayed transactional data, and transmit the relayed transactional data to the acquirer network.

15. The method of claim 12, wherein the second PUS merchant device is programmed to receive the encrypted transactional data from the first POS merchant device.

16. The method of claim 12, wherein the second POS merchant device is included in a first route between the first POS merchant device and the controller specified in the routing table, wherein the first route is shorter than a second route between the first PUS merchant device and the controller, the second route including the third POS merchant device.

17. The method of claim 12, wherein the signed token is used to at least one of identify or authenticate the transactional data.

18. The method of claim 12, wherein the first POS merchant device is programmed to store routing information relating to a preferred fourth POS merchant device.

19. The method of claim 12, wherein the controller is configured to facilitate linking the first POS merchant device and the second POS merchant device into a virtual network, the controller configured to receive encrypted transactional data from at least one of: the first POS merchant device or the second POS merchant device to determine an acquirer network for the encrypted transactional data and to transmit the encrypted transactional data to the acquirer network.

* * * * *